United States Patent
Hagiwara (10) Patent No.: US 10,748,507 B2
(45) Date of Patent: Aug. 18, 2020

(54) IMAGE DISPLAY DEVICE, IMAGE LIST DISPLAY METHOD, AND IMAGE LIST DISPLAY PROGRAM

(71) Applicant: Hiroshi Hagiwara, Kanagawa (JP)

(72) Inventor: Hiroshi Hagiwara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/204,379

(22) Filed: Nov. 29, 2018

(65) Prior Publication Data

US 2019/0096368 A1    Mar. 28, 2019

Related U.S. Application Data

(63) Continuation of application No. 13/822,773, filed as application No. PCT/JP2011/070470 on Sep. 8, 2011, now Pat. No. 10,170,082.

(30) Foreign Application Priority Data

Oct. 4, 2010    (JP) .................................. 2010-224652

(51) Int. Cl.
*G09G 5/36*    (2006.01)
*G06F 16/54*    (2019.01)
(Continued)

(52) U.S. Cl.
CPC ............... *G09G 5/36* (2013.01); *G06F 16/54* (2019.01); *H04N 1/32122* (2013.01);
(Continued)

(58) Field of Classification Search
CPC ................ G09G 5/36; H04N 5/44591; H04N 21/440272; H04N 21/47217;
(Continued)

(56) References Cited

U.S. PATENT DOCUMENTS

2001/0033303 A1*  10/2001  Anderson ............. G06T 3/0018
                                                            715/854
2002/0135621 A1    9/2002  Angiulo et al.
(Continued)

FOREIGN PATENT DOCUMENTS

JP    2002-507347 A    3/2002
JP    2002-513539 A    5/2002
(Continued)

OTHER PUBLICATIONS

Communication dated Apr. 3, 2018, from Japanese Patent Office in counterpart application No. 2017-121647.
(Continued)

*Primary Examiner* — Ke Xiao
*Assistant Examiner* — Kim Thanh T Tran
(74) *Attorney, Agent, or Firm* — Sughrue Mion, PLLC (57) ABSTRACT

To display an image list stored in a memory with good visibility and to display the image list at a high speed, an image display device reads an image file in an Exif format, extracts a thumbnail image included in the image file in the Exif format, and generates a displayed image having a predetermined size and a square shape, thus displaying it in the image list. It is possible to improve visibility in displaying the image file aligning square-shaped displayed image having the same size while precluding blanks. It is possible to perform high-speed processing in producing an image list using thumbnail images included in image files in the Exif format.

3 Claims, 9 Drawing Sheets

(51) Int. Cl.
  *H04N 1/387* (2006.01)
  *H04N 5/445* (2011.01)
  *H04N 21/432* (2011.01)
  *H04N 21/472* (2011.01)
  *H04N 1/32* (2006.01)
  *H04N 21/4402* (2011.01)
  *H04N 21/81* (2011.01)
  *H04N 21/854* (2011.01)
  *H04N 1/00* (2006.01)
  *H04N 5/76* (2006.01)
  *H04N 101/00* (2006.01)

(52) U.S. Cl.
  CPC ......... *H04N 1/32128* (2013.01); *H04N 1/387* (2013.01); *H04N 5/44591* (2013.01); *H04N 21/4325* (2013.01); *H04N 21/440272* (2013.01); *H04N 21/47217* (2013.01); *H04N 21/8153* (2013.01); *H04N 21/85406* (2013.01); *H04N 1/0044* (2013.01); *H04N 1/00453* (2013.01); *H04N 5/76* (2013.01); *H04N 2101/00* (2013.01); *H04N 2201/325* (2013.01); *H04N 2201/3273* (2013.01); *H04N 2201/3274* (2013.01)

(58) Field of Classification Search
  CPC ......... H04N 21/85406; H04N 1/32128; H04N 21/4325; H04N 21/8153; H04N 1/32122; H04N 1/387; H04N 5/76; H04N 2201/325; H04N 1/00453; H04N 2101/00; H04N 1/0044; H04N 2201/3273; H04N 2201/3274; G06F 17/30274; G06F 16/54
  USPC .......................................................... 345/619
  See application file for complete search history.

(56) References Cited

U.S. PATENT DOCUMENTS

| | | | |
|---|---|---|---|
| 2003/0191756 A1 | 10/2003 | Oh | |
| 2004/0151371 A1* | 8/2004 | Chen | G06K 9/00234 382/165 |
| 2004/0181754 A1 | 9/2004 | Kremer et al. | |
| 2005/0168763 A1* | 8/2005 | Higuchi | H04N 1/00442 358/1.13 |
| 2005/0251015 A1 | 11/2005 | Takikawa et al. | |
| 2006/0197844 A1 | 9/2006 | Sekiguchi | |
| 2006/0257133 A1 | 11/2006 | Shikata | |
| 2010/0013950 A1* | 1/2010 | Kikuchi | H04N 1/3872 348/222.1 |
| 2010/0050114 A1* | 2/2010 | Braun | G06F 3/04817 715/788 |
| 2010/0104177 A1* | 4/2010 | Homma | G06F 17/30899 382/164 |
| 2010/0128986 A1* | 5/2010 | Xu | G06K 9/3208 382/190 |
| 2010/0228746 A1 | 9/2010 | Harada | |
| 2010/0318550 A1* | 12/2010 | Yamamoto | G06F 17/30277 707/765 |
| 2011/0074824 A1* | 3/2011 | Srinivasan | G06F 3/04883 345/660 |

FOREIGN PATENT DOCUMENTS

| | | |
|---|---|---|
| JP | 2003-46911 A | 2/2003 |
| JP | 2005-130471 A | 5/2005 |
| JP | 2006-148302 A | 6/2006 |
| JP | 2006-262071 A | 9/2006 |
| JP | 2006-293751 A | 10/2006 |
| JP | 2006-295749 A | 10/2006 |
| JP | 2006-303937 A | 11/2006 |
| JP | 2007-13473 A | 1/2007 |
| JP | 2007-089086 A | 4/2007 |
| WO | 02/41629 A1 | 5/2002 |

OTHER PUBLICATIONS

Communication dated Jan. 10, 2017 issued by the Japanese Patent Office in counterpart application No. 2016-034106.
Notice of Allowance dated May 23, 2017 issued by the Japanese Patent Office in counterpart application No. 2016-034106.
International Search Report for Entry of PCT/JP2011/070470 dated Oct. 4, 2011.

* cited by examiner

DATA CONFIGURATION OF Exif FILE

IMAGE DISPLAY DEVICE, IMAGE LIST DISPLAY METHOD, AND IMAGE LIST DISPLAY PROGRAM

CROSS REFERENCE TO RELATED APPLICATIONS

This application is a Continuation application of U.S. application Ser. No. 13/822,773 filed Apr. 3, 2013, which is a National Stage Entry of International Application No. PCT/JP2011/070470 filed Sep. 8, 2011, which claims priority from Japanese Patent Application No. 2010-224652 filed Oct. 4, 2010, the contents of all of the prior applications are incorporated herein by reference in their entireties.

TECHNICAL FIELD

The present invention relates to an image display device, an image list display method, and an image list display program, which are preferable to display a list of image files.

BACKGROUND ART

Most of images shot with digital cameras and image devices of camera-embedded mobile phones which have been spread recently are produced in formats based on an image file format standard for digital still cameras (hereinafter, referred to as Exif (a registered trademark) (EXchangeable Image File format)) (for example, disclosed in Patent Literature 1).

Image files in the Exif format include camera information and thumbnail image data as well as main image data. Compared to main image data in a high density of pixels, thumbnail image data with a small data size can be processed at high speed. Thus, it is possible to speedily display a list of images by use of thumbnail mages included in image files in the Exif format.

However, thumbnail images are defined in an aspect ratio "4:3" and defined by an image size "160×120" in comparison with main images which may include vertical images and horizontal images as well as images having various aspect ratios (aspect ratios) in image files in the Exif format. Thumbnail images store main images which are reduced in size but with maintaining their aspect ratios. Thus, blanks may be formed in displayed parts when an image list is produced using thumbnail images included in image files in the Exif format.

Figure 9:
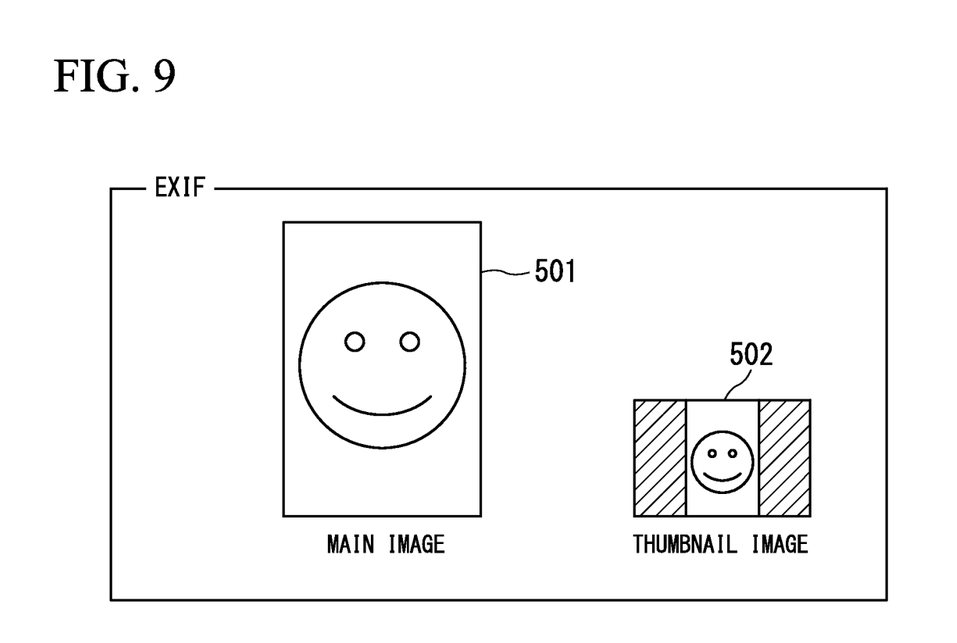
FIG. 9 Illustrations for conventional examples of thumbnail images with blanks occurring in an image file in the Exif format.

This drawback will be described in detail with reference to FIG. 9. FIG. 9 shows an example of a main image 501 which is a vertical image described in an image file in the Exif format. In an image file in the Exif format, a thumbnail image, which is a horizontal image with an aspect ratio "4:3", does not match with a vertical image. Therefore, as shown in FIG. 9, blanks (illustrated using slashes) should be formed in the left and right areas around a thumbnail image 502 corresponding to the main image 501 which is a vertical image described in an image file in the Exif format.

Figure 10:
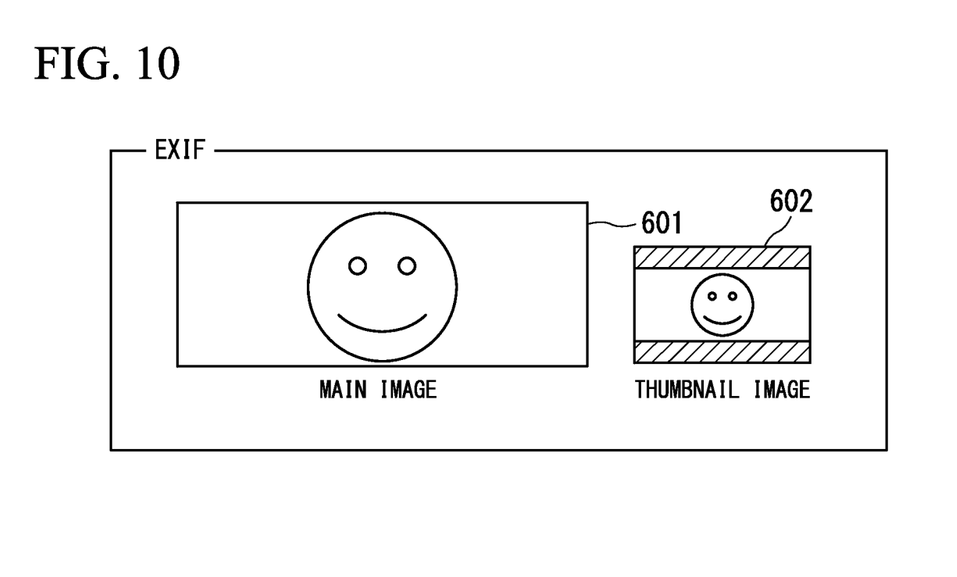
FIG. 10 Illustrations for other conventional examples of thumbnail images with blanks occurring in an image file in the Exif format.

FIG. 10 shows an example of a main image 601 which is a horizontal image with a wider aspect ratio (e.g. an aspect ratio "16:9") than an aspect ratio "4:3" in an image file in the Exif format. In an image file in the Exif format, a thumbnail image having the aspect ratio "4:3" does not match with an image having the aspect ratio "16:9". Therefore, as shown in FIG. 10, blanks should be formed in the upper and lower areas around a thumbnail image 602 corresponding to the main image 601 with the aspect ratio "16:9" in an image file in the Exif format.

Figure 11:
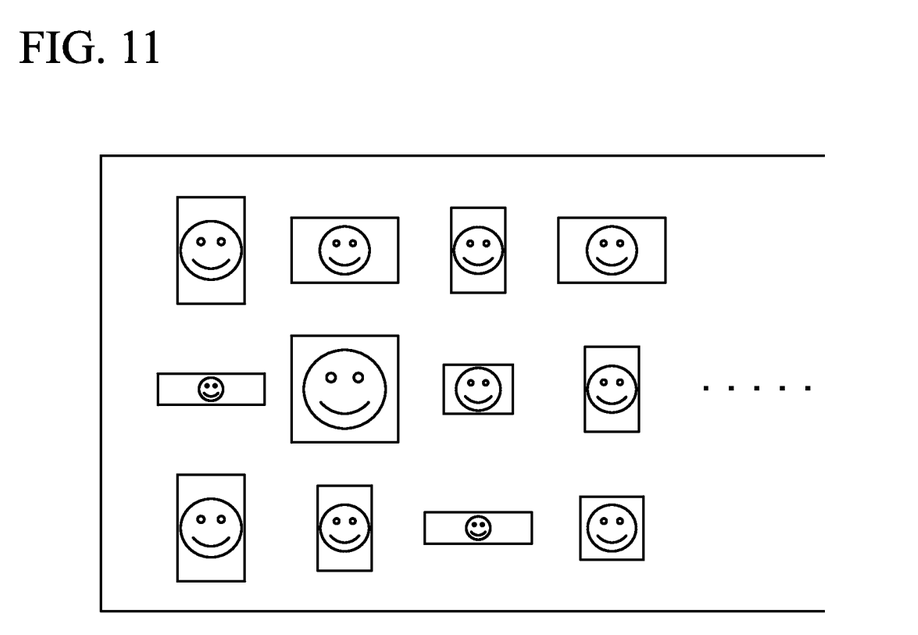
FIG. 11 Illustrations for a conventional list of images displayed in different aspect ratios.

Considering an image list which is produced using thumbnail images described in image files in the Exif format, it is possible to display a list using thumbnail images precluding blanks. However, as shown in FIG. 11, a list of thumbnail images precluding blanks includes mixture of images having various aspect ratios; this may cause a disorder in displayed content while degrading visibility.

In particular, mobile phones using images in various applications, such as applications for displaying standby screens or icons, may suffer from a large number of images having different sizes and different aspect ratios in comparison with generally-available digital cameras. Therefore, an image list using thumbnail images may describe mixture of images having different sizes so as to undergo degradation of visibility.

Additionally, Patent Literatures 2 and 3 disclose display devices which are designed to display square-shaped images in an image list, thus improving visibility of images. Thus, it is possible to improve visibility by displaying square-shaped images in an image list.

CITATION LIST

Patent Literature

Patent Literature 1: International Publication No. WO02/41629
Patent Literature 2: Japanese Patent Application Publication No. 2006-262071
Patent Literature 3: Japanese Patent Application Publication No. 2007-89086

SUMMARY OF INVENTION

Technical Problem

As described above, thumbnail images are defined in size and in aspect ratios according to standards while main images are produced with various sizes and various aspect ratios in image files in the Exif format. Thus, an image list using thumbnail images, included in image files in the Exif format, additionally includes blanks around images, which in turn degrades visibility.

The display devices disclosed in Patent Literatures 2 and 3 are designed to produce square-shaped images, which are displayed in a list form, by use of main images instead of thumbnail images in the Exif format. Every time displaying a list, the display devices extract images from main images about a focus position in shooting and subsequently resize them in a list-displayed size. Thus, the display devices of Patent Literatures 2 and 3, which handle main images with a large data size, should bear a high processing load, thus causing a reduction of processing speed. Additionally, the display devices need a large capacity of memory to expand main images, which in turn causes problems such as a delay of processing and difficulty in editing due to a shortage of memory.

Considering the foregoing problems, the present invention realizes an object to provide an image display device, an image list display method, and an image list display program, implementing a function to display an image list stored therein with good visibility and to display an image list at high speed.

Solution to Problem

To solve the above problem, an image display device of the present invention includes a memory which stores an image file including a main image and a thumbnail image; an image file extraction part which reads the image file from the memory so as to extract the thumbnail image included in the read image file; a square-shaped image generation part which generates a square-shaped displayed image having a predetermined size based on the thumbnail image included in the image file; and a display part which displays the square-shaped displayed image in an image list.

An image list display method of the present invention is an image list display method which generates an image list using an image file including a main image and a thumbnail image, wherein it extracts the thumbnail image included in the image file, generates a square-shaped displayed image having a predetermined size based on the thumbnail image included in the image file, and displays the square-shaped displayed image in the image list.

An image list display program of the present invention is an image list display program which generates an image list using an image file including a main image and a thumbnail image, wherein it includes a step of extracting the thumbnail image included in the image file, a step of generating a square-shaped displayed image having a predetermined size based on the thumbnail image included in the image file, and a step of displaying the square-shaped displayed image in the image list.

Advantageous Effects of Invention

The present invention is designed to display an image list in which square-shaped images, precluding blanks, with the same size are aligned in a displayed area, thus improving visibility. Additionally, the present invention can perform high-speed processing because displayed images are produced using thumbnail image data, having the predetermined size and the predetermined aspect ratio, with a small data size.

DESCRIPTION OF EMBODIMENTS

Hereinafter, embodiments of the present invention will be described with reference to drawings.

First Embodiment

Figure 1:
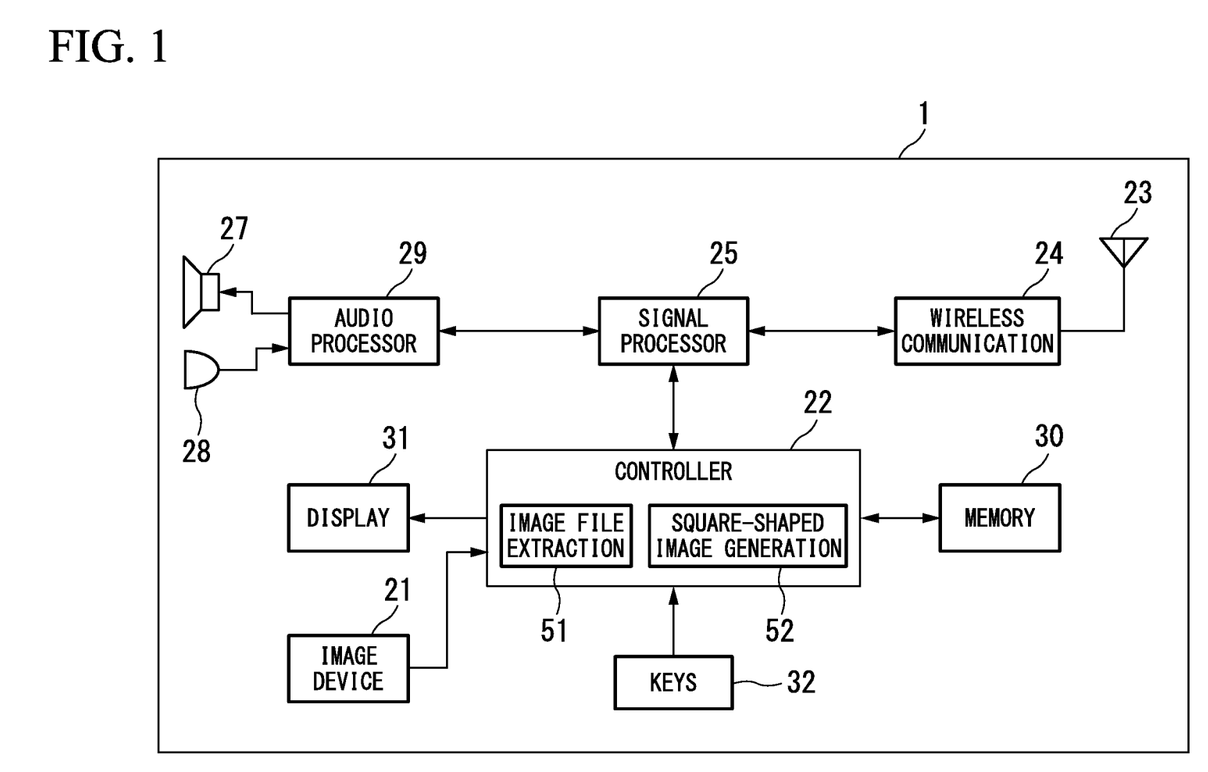
FIG. 1 A block diagram showing an image display device according to a first embodiment of the present invention.

FIG. 1 is a block diagram showing the configuration of a mobile phone 1 equipped with a camera, which is an image display device according to the first embodiment of the present invention. As shown in FIG. 1, the mobile phone 1 with a camera includes an image device 21, a controller 22, a built-in antenna 23, a wireless communication part 24, a signal processor 25, a speaker 27, a microphone 28, an audio processor 29, a memory 30, a display 31, and various keys 32.

As the image device 21, it is possible to use a CCD (Charge Coupled Device) image sensor or a CMOS (Complementary MOS) image sensor. A subject image shot with the image device 21 is digitized, subjected to compressive coding according to the JPEG (Joint Photographic Experts Group) scheme under control of the controller 22, and then stored in the memory 30 as an image file in the Exif format.

The controller 22 is configured of a CPU (Central Processing Unit) to control the entirety of a device. The controller 22 is associated with the memory 30 and the display 31. As described above, the memory 30 stores image data shot with the image device 21 as well as various types of data such as telephone directory data and mail data. As the memory 30, it is possible to use a card-type flash memory other than a built-in memory.

For example, the display 31 is a liquid crystal display. The display 31 shows various types of characters and images. Additionally, the display 31 may serve as a view finder to shoot an image with the image device 21. The display 31 may show a screen reproducing image data stored in the memory 30. Moreover, the first embodiment of the present invention allows the display 31 to show a list of images stored in the memory 30. At this time, the first embodiment of the present invention shows an image list aligning square-shaped images with the same size.

In order to display an image list aligning square-shaped images having the same size stored in the memory 30, as described above, the first embodiment of the present invention includes an image file extraction part 51 and a square-image generation part 52 which are implemented in the controller 22 executing predetermined programs. The image file extraction part 51 reads an image file in the Exif format from the memory 30, thus extracting thumbnail images included in the read image file. The square-shaped image generation part 52 generates square-shaped images based on thumbnail images extracted from the image file extraction part 51.

The functionality of a mobile phone is implemented using the built-in antenna 23, the wireless communication part 24, the signal processor 25, the speaker 27, the microphone 28, and the audio processor 29. As the communication scheme for a mobile phone, it is possible to name various schemes such as PDC (Personal Digital Cellular), GSM (Global System for Mobile Communication), CDMA (Code Division Multiple Access), CDMA-2000, and WCDMA (Wideband CDMA). The present invention may adopt any type of schemes.

The built-in antenna 23 receives radio waves from neighboring base stations or transmits radio waves to neighboring base stations. The wireless communication part 24 performs wireless communication with neighboring base stations. The signal processor 25 processes received/transmitting signals. The speaker 27 produces sound while the microphone 28 receives sound. The audio processor 29 processes various audio signals, such as receiver sound, in order to supply them to the speaker 27. Additionally, it processes audio signals transmitted from the microphone 28.

According to the first embodiment as described above, when the mobile phone 1 with a camera is operated to shoot a subject image with the image device 21, an image signal from the image device 21 is compressed in the JPEG format, for example, under control of the controller 22 and then stored in the memory 30 as an image file in the Exif format.

Figure 2:
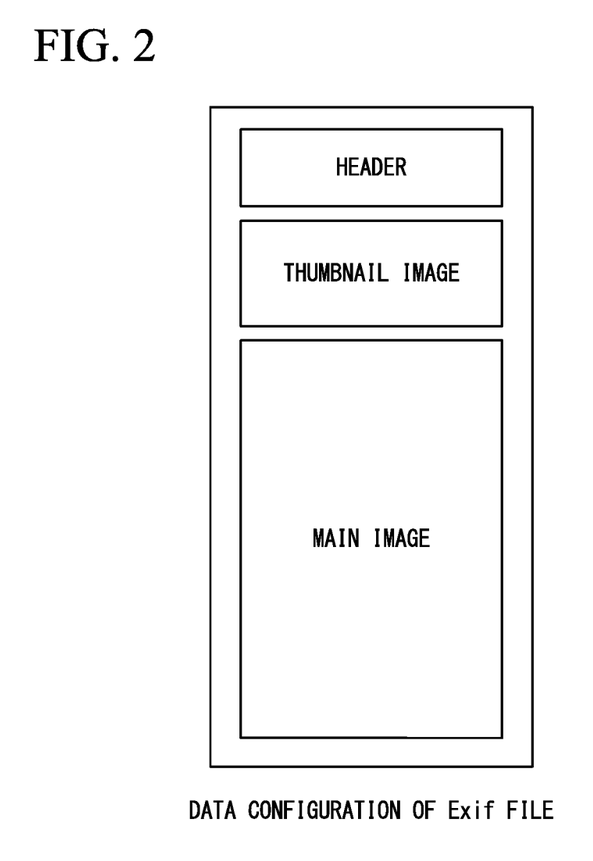
FIG. 2 An illustration for a data configuration of an image file in an Exif format used in the first embodiment of the present invention.

FIG. 2 shows a data configuration of an image file in the Exif format (Exif 2.1). As show in FIG. 2, an image file in the Exif format includes a header, a thumbnail image, and a main image. The header describes camera information at a shooting time, such as a pixel count, a compression mode, a shooting date/time, a device type, an aperture value, and a color space. Main images may have various sizes and various aspect ratios, such as "240×320", "480×640", "960×1280", "1024×1280", "320×240", "640×480", "1280×960", and "1280×1024". According to standards, thumbnail images are defined in an aspect ratio "4:3" and in an image size "160×120". Additionally, each thumbnail image includes an effective image area which is an area of a main image which is reduced in size while maintaining its aspect ratio.

The mobile phone 1 with a camera produces square-shaped images with the same size based on thumbnail images included in image files in the Exif format, thus displaying an image list. That is, it displays an image list aligning square-shaped images with the same size, thus improving visibility.

Figure 3:
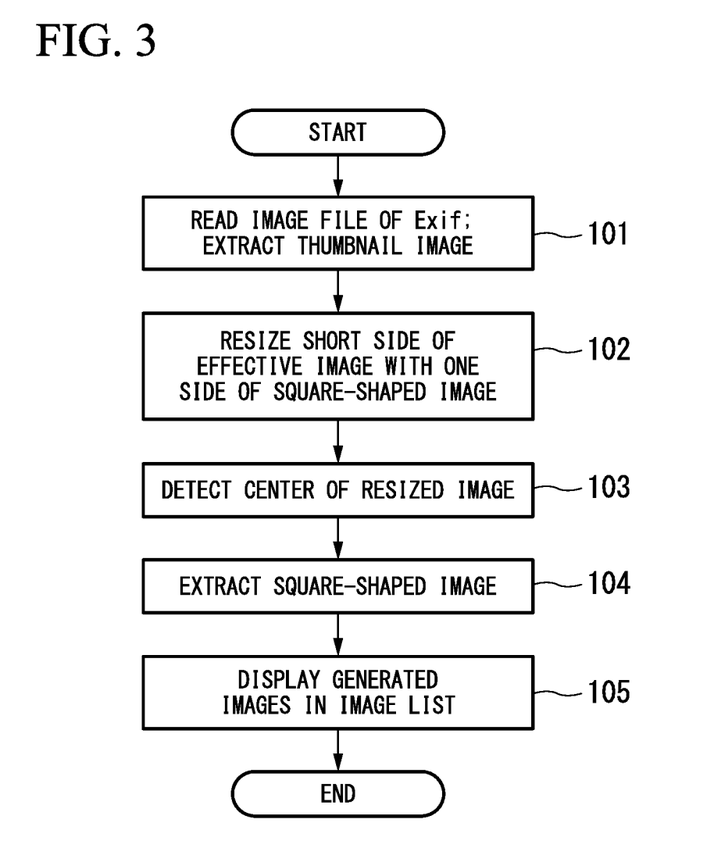
FIG. 3 A flowchart showing a process of producing a list of square-shaped images displayed according to the first embodiment of the present invention.

FIG. 3 is a flowchart showing a process for producing square-shaped images based on thumbnail images included in image files in the Exif format according to the first embodiment of the present invention.

In FIG. 3, in order to produce square-shaped images based on thumbnail images included in image files in the Exif format, the controller 22 reads image files in the Exif format from the memory 30 so as to extract thumbnail images included in image files in the Exif format (step 101). Next, the controller 22 specifies a short side of an effective image area of each thumbnail image. Subsequently, the controller 22 resizes each thumbnail image while maintaining its aspect ratio so that the size of the specified short side will match with the size of one side of each square-shaped image (step 102). Then, the controller 22 detects the center of a resized image (step 103) so as to extract a square-shaped image with a center of gravity at the center of the resized image (step 104). Thus, it is possible to produce a square-shaped image with a predetermined size, which may include all the pixels on a short side of an effective image area of a thumbnail image. Thus, the controller 22 displays an image list including square-shaped images, each of which is produced as described above (step 105).

As described above, thumbnail images described in files in the Exif format are each standardized into the aspect ratio "4:3" and the image size "160×120". In contrast, main images may have various aspect ratios. Therefore, thumbnail images may cause blanks as shown in FIG. 4.

Figure 4:
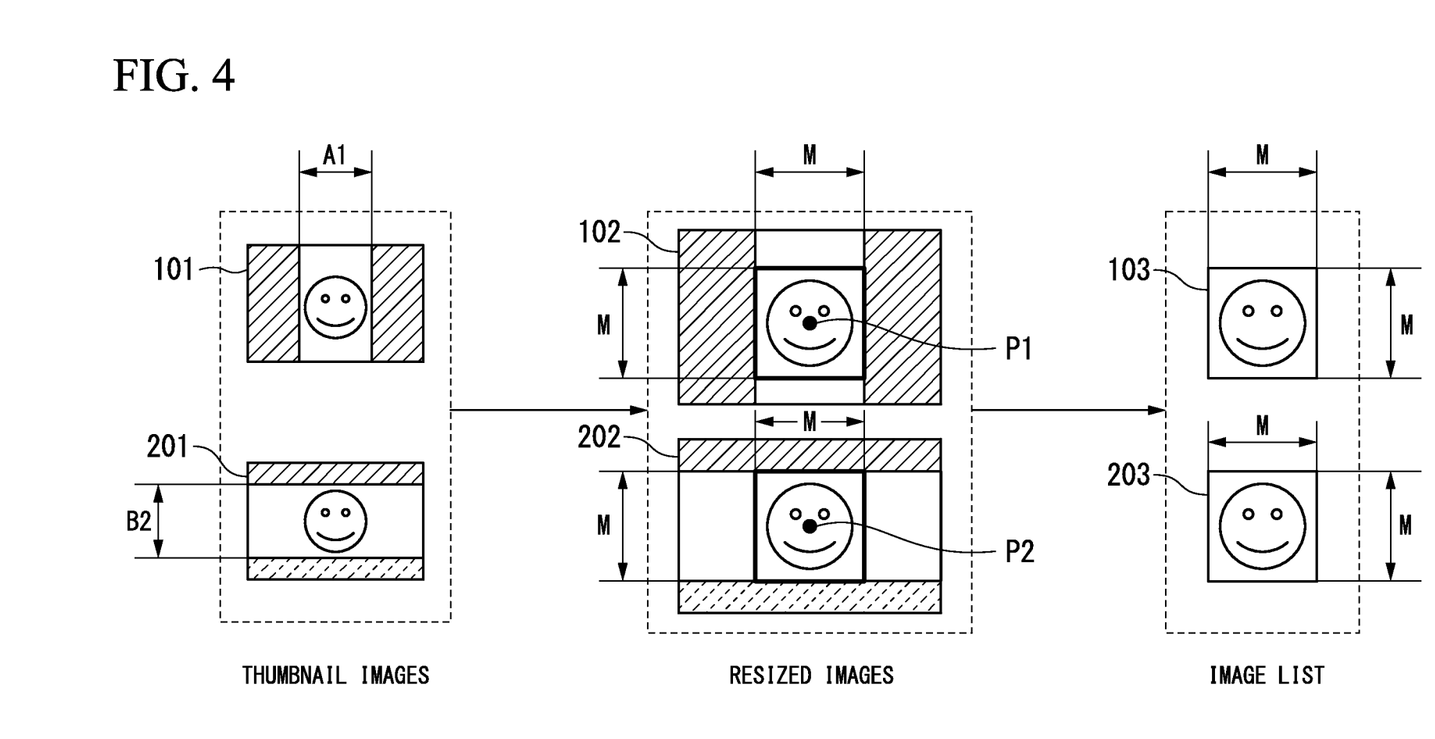
FIG. 4 Explanatory illustrations for a process of producing a list of square-shaped images displayed according to the first embodiment of the present invention.

In FIG. 4, a thumbnail image 101 exemplifies a thumbnail image with blanks formed at left and right positions. Those blanks occur with respect to a vertically shot image in comparison with a horizontal thumbnail image included in an image file in the Exif format. The short-side length of the thumbnail image 101, accompanied with blanks at left and right positions, is equal to a size A1 in the horizontal direction of an effective image area.

In FIG. 4, a thumbnail image 201 exemplifies a thumbnail image with blanks at upper and lower positions. Those blanks occur with respect to a horizontally shot image with a wider aspect ratio (e.g. "16:9") than the aspect ratio "4:3" in comparison with a thumbnail image, included in an image file in the Exif format, with an aspect ratio "4:3". The short-side length of the thumbnail image 201, accompanied with blanks at upper and lower positions, is equal to a size B2 in the vertical direction of an effective image area.

Figure 5:
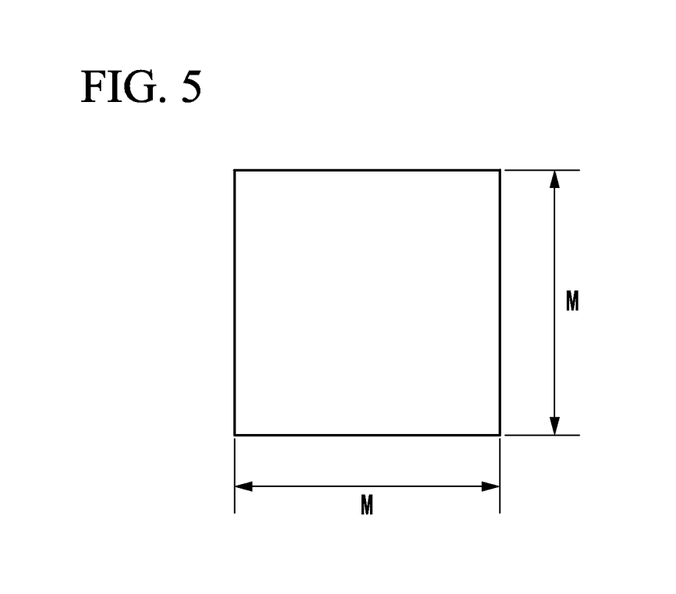
FIG. 5 An explanatory illustration for a process of producing a list of square-shaped images displayed according to the first embodiment of the present invention.

As shown in FIG. 5, an image list may include square-shaped images displayed with a size "M×M".

When the thumbnail image 101 shown in FIG. 4 is extracted from an image file in the Exif format which is read from the memory 30 in step 101, the short-side size A1 of an effective image area in the thumbnail image 101 is resized with the one-side size M of a square-shaped image in step 102. Thus, it is possible to generate a resized image 102 as shown in FIG. 4.

When the thumbnail image 201 shown in FIG. 4 is extracted from an image file in the Exif format which is read from the memory 30 in step 101, the short-side size B2 of an effective image area in the thumbnail image 201 is resized with the one-side size M of a displayed image in step 102. Thus, it is possible to generate a resized image 202.

As shown in FIG. 4, after generation of the resized images 102, 202, the centers of the resized images 102, 202 are detected in step 103; then, square-shaped images are extracted from the centers of the resized images 102, 202.

A center P1 is detected from the resized image 102 in step 103; then, a square-shaped portion with the size (M×M) is extracted from the center P1 in step 104. Thus, it is possible to generate a square-shaped image 103 with the one-side length M shown in FIG. 4.

A center P2 is detected from the resized image 202 in step 103; then, a square-sized portion with the size (M×M) is extracted from the center P2 in step 104. Thus, it is possible to generate a square-shaped image 203 with the one-side length M as shown in FIG. 4.

Figure 6:
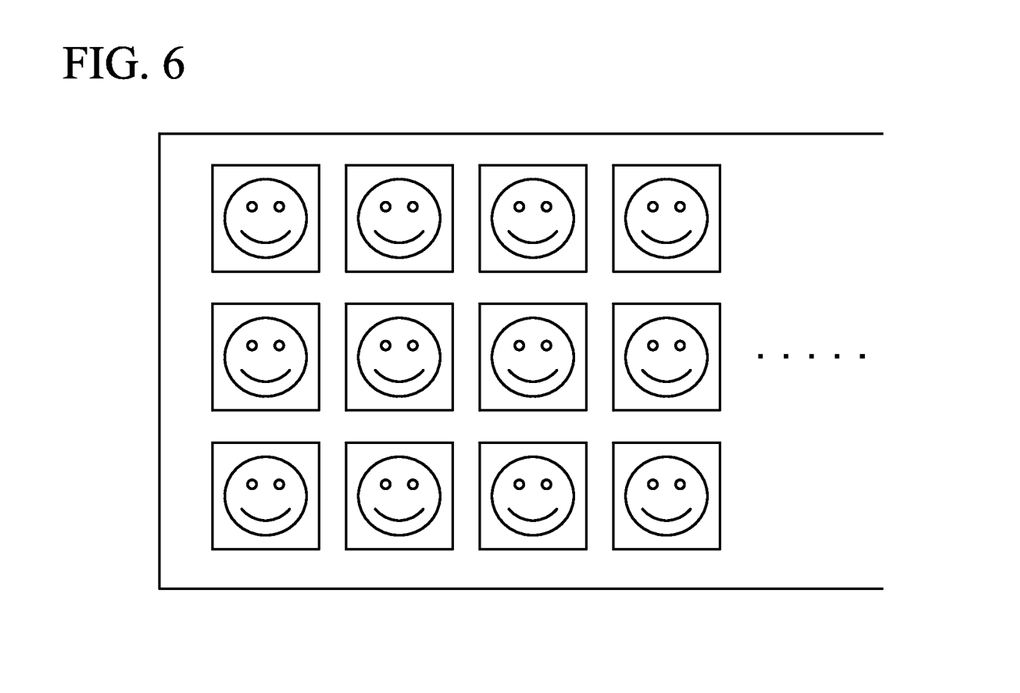
FIG. 6 An explanatory illustration for a list of images displayed according to the first embodiment of the present invention.

Upon generating square-shaped images, square-shaped images are displayed in an image list as shown in FIG. 6 in step 105. According to the first embodiment of the present invention, the mobile phone 1 with a camera is able to realize alignment of square-shaped images with the same size and without blanks. Thus, it is possible to improve visibility.

According to the first embodiment of the present invention, as described above, the mobile phone 1 with a camera generates square-shaped images with the same size based on thumbnail images included in image files in the Exif format, thus displaying an image list. Herein, it deals with image data which is thumbnail image data with a small data size, a predetermined image size, and a predetermined aspect ratio. Additionally, it does not need complex calculating processes but it needs a resizing process and an image extracting process. Thus, it is possible to achieve high-speed processing without using a large-capacity memory.

Second Embodiment

Next, the second embodiment of the present invention will be described. The image display device of the first embodiment is designed to extract a thumbnail image included in an image file in the Exif format, resize the thumbnail image such that a short side of an effective image area will match with one side of a display image, detect the center of the resized image, extract a square-shaped image from the center of the resized image, and produce a square-shaped image having a predetermined size.

In contrast, the second embodiment is designed to extract a thumbnail image included in an image file in the Exif format, detect the center of the thumbnail image, extract a square-shaped image from the center of the thumbnail image in conformity with an effective image area, resize the extracted square-shaped image, and produce a square-shaped image having a predetermined size. Other parts are identical to those of the first embodiment; hence, duplicate descriptions thereof are precluded herein.

Figure 7:
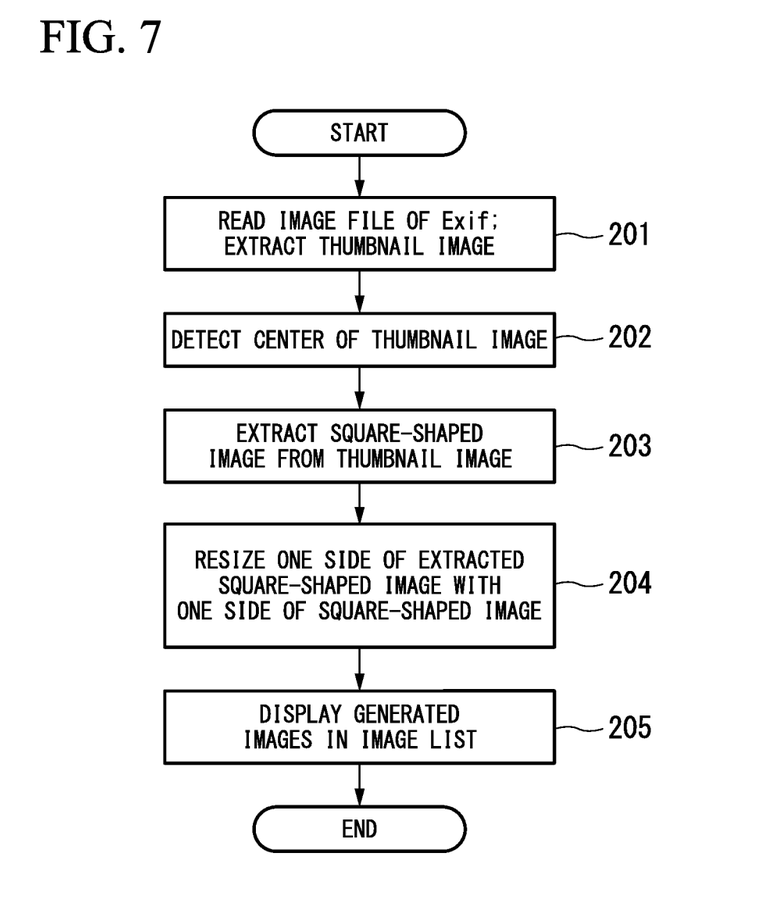
FIG. 7 A flowchart showing a process of producing a list of square-shaped images displayed according to a second embodiment of the present invention.

FIG. 7 is a flowchart showing a process of producing a square-shaped image based on a thumbnail image included in an image file in the Exif format.

In FIG. 7, in order to generate a square-shaped image based on a thumbnail image included in an image file in the Exif format, the controller 22 reads an image file in the Exif format from the memory 30 and extracts a thumbnail image included in the image file in the Exif format (step 201). Subsequently, the controller 22 detects the center of the thumbnail image (step 202) and extracts a square-shape image from the center of the thumbnail image in conformity with an effective image area (step 203).

Specifically, the controller 22 extracts a square-shaped image which may include all the pixels on a short side of an effective image area passing through a center of an effective image area included in the thumbnail image. Additionally, the controller 22 resizes the extracted image such that the size of one side of the extracted square-shaped image will match with the size of one side of a square-shaped image (step 204). Thus, it is possible to generate a square-shaped image having a predetermined size, which may include all the pixels on a short side of an effective image area of a thumbnail image. Then, the controller 22 displays an image list including square-shaped images which are generated as described above (step 205).

Figure 8:
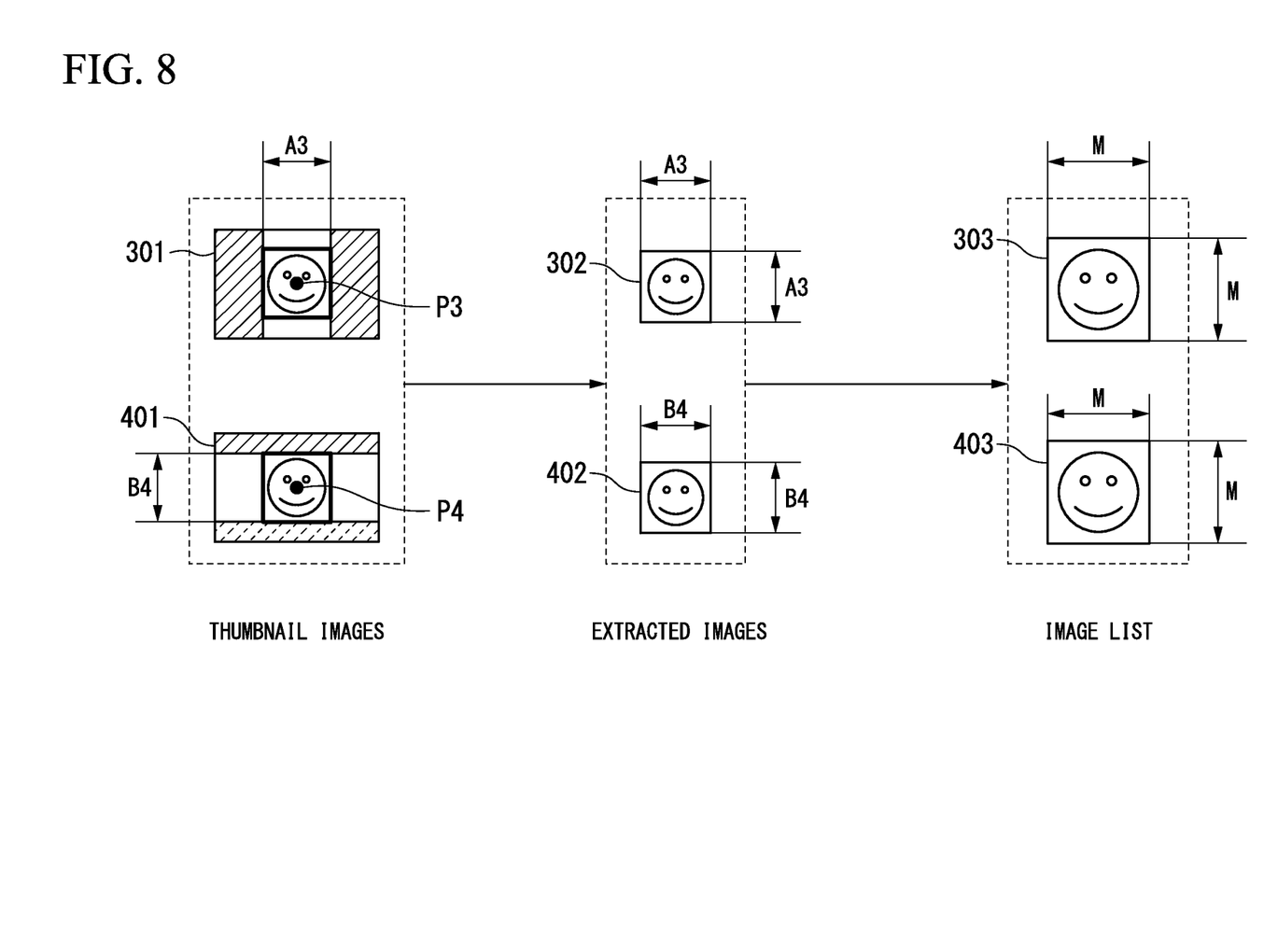
FIG. 8 Explanatory illustrations for a process of producing a list of square-shaped images displayed according to the second embodiment of the present invention.

In FIG. 8, a thumbnail image 301 exemplifies a thumbnail image with blanks occurring at left and right positions. In FIG. 8, a thumbnail image 401 exemplifies a thumbnail image with blanks occurring at upper and lower positions. Additionally, an image list may include images, each of which should be displayed in the form of a square-shaped image with the size "M×M".

When the thumbnail image 301 of FIG. 8 is extracted from an image file in the Exif format read from the memory 30 in step 201, a center P3 of the thumbnail image 301 is detected in step 202; then, an effective image area having a square shape is extracted from the center P3 of the thumbnail image 301 in step 203. Thus, it is possible to extract a square-shaped image 302 in FIG. 8. At this time, the one-side length of the extracted square-shaped image 302 matches with a short-side size A3 of the effective image area of the thumbnail image 301 in the horizontal direction.

When the thumbnail image 401 of FIG. 8 is extracted from an image file in the Exif format read from the memory 30 in step 201, a center P4 of the thumbnail image 401 is detected in step 202; then, an effective image area having a square shape is extracted from the center P4 of the thumbnail image 401 in step 203. Thus, it is possible to extract a square-shaped image 302 in FIG. 8. At this time, the one-side length of the extracted square-shaped image 402 matches with a short-side size B4 of the effective area of the thumbnail image 401 in the vertical direction.

In step 204, the one-side sizes of the extracted square-shaped images 302, 402 are each resized in conformity with the one-side size of a square-shaped image.

In FIG. 8, A3 denotes the one-side length of the extracted square-shaped image 302. Therefore, the one-side length A3 of the extracted square-shaped image 302 is resized in conformity with the one-side length M of a displayed image in step 204. Thus, it is possible to generate a square-shaped image 303 shown in FIG. 8.

In FIG. 8, B4 denotes the one-side length of the extracted square-shaped image 402. Therefore, the one-side length B4 of the extracted square-shaped image 402 is resized in conformity with the one-side length M of a displayed image. Thus, it is possible to generate a square-shaped image 403.

The second embodiment of the present invention is designed to display an image list aligning square-shaped images having the same size and precluding blanks, thus improving visibility. Additionally, it deals with image data which is thumbnail image data with a small data size, a predetermined image size, and a predetermined aspect ratio. Additionally, it does not need complex calculating processes but carries out an image extracting process and a resizing process. Thus, it is possible to realize high-speed processing without using a large capacity memory.

The present invention is not necessarily limited to the foregoing embodiments and therefore adapted to various modifications and applications within the scope not deviating from the subject matter of the present invention.

The foregoing embodiments are described with respect an image list using square-shaped images having the predetermined size; but this is not a restriction; hence, it is possible to use rectangular images having the predetermined size.

When the first embodiment employs rectangular images as displayed images, the controller 22 performs the following processing in step 102. That is, the controller 22 performs a resizing process of changing the size of each thumbnail image while maintaining its aspect ratio such that the short-side size of an effective image area will agree with the short-side size of the counterpart image.

When a rectangular image with the size "160×120" is used as a displayed image, for example, the controller 22 determines whether the short side of an effective image area lies in a horizontal direction or in a vertical direction. When the short side of an effective image area lies in the horizontal direction, the controller 22 resizes a thumbnail image to change its size while maintaining its aspect ratio such that the short-side size of an effective image area will agree with the one-side size of a displayed image, i.e. 160, in the horizontal direction. On the other hand, when the short side of an effective image area lies in the vertical direction, the controller 22 resizes a thumbnail image to change its size while maintaining its aspect ratio such that the short-side size of an effective image area will agree with the one-side size of a displayed image, i.e. 120, in the vertical direction.

Due to the above processing, the first embodiment is redesigned to employ rectangular images as displayed images.

When the second embodiment employs rectangular images as displayed images, the controller 22 performs the following processing in step 203. That is, the controller 22 performs a process for extracting a rectangular image, with the same aspect ratio as a displayed image, which may include all the pixels on a short side of an effective image area of a thumbnail image.

When a rectangular image with the size "160×120 (aspect ratio 4:3)" is used as a displayed image while a thumbnail image includes an effective image area with the size "160×90", for example, the controller 22 extracts a rectangular image with the size "120×90 (aspect ratio 4:3)".

On the other hand, when a rectangular image with the size "160×120 (aspect ratio 4:3)" is used as a displayed image while a thumbnail image includes an effective image area with the size "100×120", the controller 22 extracts a rectangular image with the size "100×75 (aspect ratio 4:3)".

Due to the above processing, the second embodiment is redesigned to use rectangular images as displayed images.

The present application claims priority based on Japanese Patent Application No. 2010-224652 filed Oct. 4, 2010, the entire content of which is incorporated herein by reference.

INDUSTRIAL APPLICABILITY

The present invention is applicable to an image display device displaying a list of image files, thus improving visibility in displaying an image list.

REFERENCE SIGNS LIST

1: mobile phone
21: image device
22: controller
23: built-in antenna
24: wireless communication part
25: signal processor
27: speaker
28: microphone
29: audio processor
30: memory
31: display
32: keys
51: image file extraction part
52: square-shaped image generation part

The invention claimed is:

1. An image display device comprising:
a memory configured to store a plurality of thumbnail images having effective image areas each having a same aspect ratio in correspondence with a plurality of main images having different aspect ratios captured by an imaging device;
a display; and
a controller configured to:
generate a plurality of resized images by changing a size of each thumbnail image while maintaining its aspect ratio such that a length of a short side of each effective image area corresponding to either a lateral side or a longitudinal side of each effective image area is resized to match a length of each side of a square shape,
extract a square image having the square shape from a resized effective image area of each thumbnail image about a center portion of each of the plurality of resized images such that a center of each resized image matches a center of gravity of the square image, and
generate a plurality of display images each corresponding to the square image and each including all pixels aligned in the center portion of each effective image area of each thumbnail image relative to pixels aligned along the short side of each effective image area in each of the plurality of thumbnail images, thus displaying the plurality of display images on the display.

2. An image display method comprising:
reading from a memory a plurality of thumbnail images having effective image areas each having a same aspect ratio in correspondence with a plurality of main images having different aspect ratios captured by an imaging device;
generating a plurality of resized images by changing a size of each thumbnail image while maintaining its aspect ratio such that a length of a short side corresponding to either a lateral side or a longitudinal side of each effective image area is resized to match a length of each side of a square shape;
extracting a square image having the square shape from a resized effective image area of each thumbnail image about a center portion of each of the plurality of resized images such that a center of each resized image matches a center of gravity of the square image;
generating a plurality of display images each corresponding to the square image and each including all pixels aligned in the center portion of each effective image area of each thumbnail image relative to pixels aligned along the short side of each effective image area in each of the plurality of thumbnail images; and
displaying a plurality of display images each corresponding to the square image on a display.

3. A non-transitory computer-readable storage medium having stored therein a computer program causing a computer to implement the image display method according to claim 2.

* * * * *